US009169618B1

(12) United States Patent
Brown

(10) Patent No.: US 9,169,618 B1
(45) Date of Patent: Oct. 27, 2015

(54) BACKFILL DEVICE AND METHOD WITH ROTATING DRUM

(71) Applicant: Brown Bear Corporation, Corning, IA (US)

(72) Inventor: Stanley L. Brown, Corning, IA (US)

(73) Assignee: BROWN BEAR CORPORATION, Corning, IA (US)

( * ) Notice: Subject to any disclaimer, the term of this patent is extended or adjusted under 35 U.S.C. 154(b) by 0 days.

(21) Appl. No.: 14/267,418

(22) Filed: May 1, 2014

(51) Int. Cl.
E02F 5/22 (2006.01)
F16L 1/028 (2006.01)

(52) U.S. Cl.
CPC ........ E02F 5/226 (2013.01); F16L 1/028 (2013.01)

(58) Field of Classification Search
USPC ............................................................ 37/142.5
IPC ............................................... E02F 5/223,5/226
See application file for complete search history.

(56) References Cited

U.S. PATENT DOCUMENTS

| 1,563,975 | A | * | 12/1925 | Goeringer ................... 37/142.5 |
| 2,857,691 | A | | 10/1958 | Curran |
| 4,633,602 | A | * | 1/1987 | Layh et al. ................... 37/195 |
| 4,664,791 | A | | 5/1987 | McClain et al. |
| 4,864,748 | A | * | 9/1989 | Boyer ........................... 37/142.5 |
| 4,912,862 | A | | 4/1990 | Bishop et al. |
| 4,955,756 | A | | 9/1990 | Klamar |
| 5,120,433 | A | | 6/1992 | Osadchuk |
| 5,195,260 | A | | 3/1993 | Osadchuk |
| 5,259,699 | A | | 11/1993 | Klamar |
| 5,430,962 | A | | 7/1995 | Osadchuk |
| 5,452,969 | A | | 9/1995 | Crook |
| 5,694,709 | A | | 12/1997 | Cronk, Jr. et al. |
| 6,029,378 | A | | 2/2000 | Cronk, Jr. |
| 6,055,749 | A | * | 5/2000 | Cronk, Jr. .................... 37/142.5 |
| 6,125,558 | A | | 10/2000 | Stewart |
| 6,318,930 | B1 | | 11/2001 | Scudder |
| 6,502,333 | B1 | | 1/2003 | Striegel |
| 6,725,942 | B2 | * | 4/2004 | Stevens ........................ 172/40 |
| 7,186,059 | B2 | | 3/2007 | Barnes |
| 7,886,463 | B2 | | 2/2011 | Greenberg et al. |
| 7,927,059 | B2 | | 4/2011 | Grassi et al. |
| 7,971,726 | B2 | | 7/2011 | Lewis |
| 2007/0000156 | A1 | * | 1/2007 | Greenberg et al. .......... 37/142.5 |

FOREIGN PATENT DOCUMENTS

EP 0587029 3/1994
WO 8911569 11/1989

* cited by examiner

Primary Examiner — Gary Hartmann
(74) Attorney, Agent, or Firm — McKee, Voorhees & Sease, PLC

(57) ABSTRACT

A backfilling device for backfilling an open trench and padding a pipe within the trench has a lateral earth moving device and a sifting device. The backfilling device is attached to a tractor that moves the lateral earth moving device into a backfill spoil pile adjacent to the trench with the sifting device located above the trench. The lateral earth moving devices moves the backfill spoil material laterally into a rotating drum of the sifting device. Smaller particles of the backfill material fall through the rotating drum, which is also vibrating to backfill the trench and pad the pipe with backfill fines. The oversize debris in the backfill material continues to move laterally and falls out the end of the rotating drum to form a pile of large piece backfill material on the side of the trench opposite from the backfill spoil pile.

19 Claims, 8 Drawing Sheets

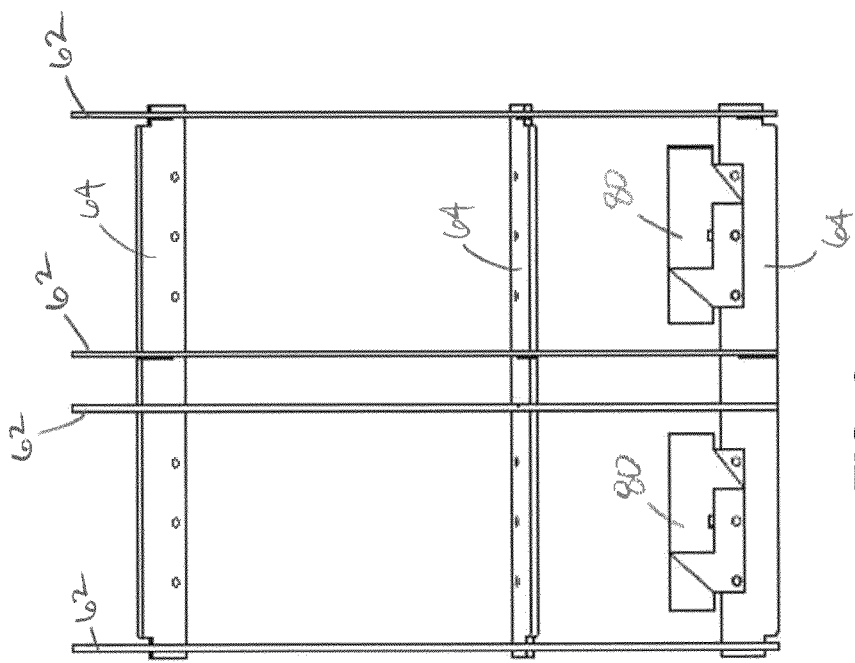
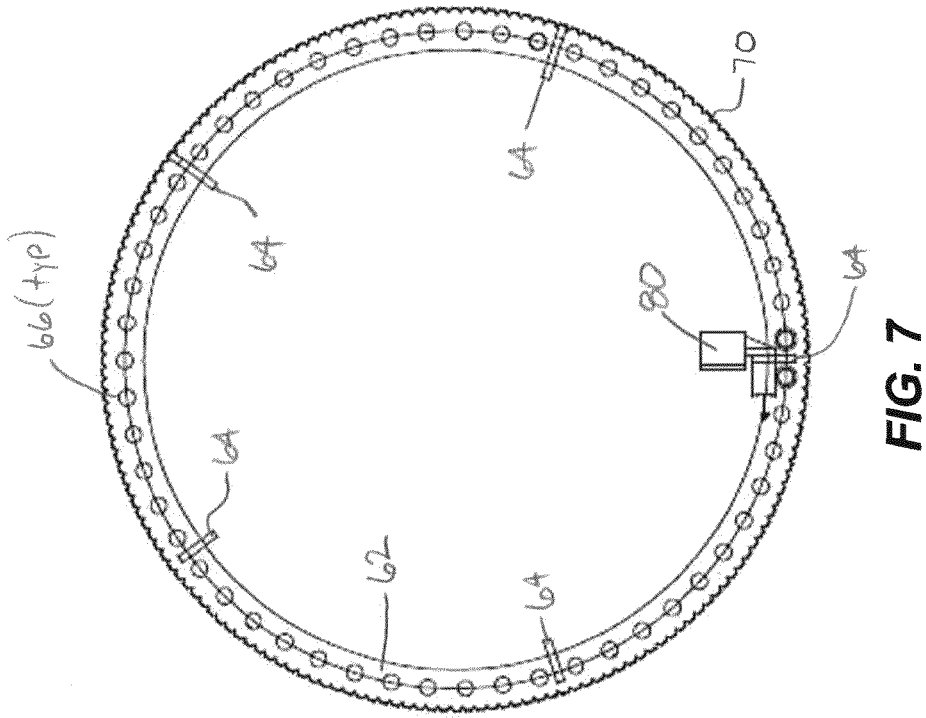
FIG. 8
FIG. 7

BACKFILL DEVICE AND METHOD WITH ROTATING DRUM

FIELD OF THE INVENTION

This invention relates generally to earth moving equipment. More specifically, this invention relates to a device and method for backfilling an open trench and padding a pipe, conduit, or wiring within the trench.

BACKGROUND OF THE INVENTION

Pipes, conduits, and wires are commonly buried underground so that they are not visible, do not use valuable aboveground space, and are insulated from the elements. These pipes, conduits, wires, and the like may generically be referred to in this application as buried elements. In order to bury the buried elements a common method is to dig a trench, lay the element being buried within the trench and then backfill the excavated material into the trench on top of the element.

In many instances is it desirable to "pad" the buried element by making sure no large rocks or other large pieces of excavated material are adjacent to the buried element. Generally this is accomplished by making sure the backfill material surrounding the buried element is smaller than a specified diameter. Padding helps protect the buried element by assuring that the fill material is tightly packed and avoids contact between the buried element and larger articles that might damage the buried element as the soil shifts, or the buried element expands or contracts, especially in reaction to changing temperatures. Commonly building regulations, best practices guidelines, and construction contracts will specify a depth and size of particle that must be used to pad a buried element. According to a common standard a buried element will need to be padded with "one inch minus backfill" (i.e., all particles in the backfill are less than or equal to one inch in diameter) to a depth of one foot above the buried element. Other maximum sizes for the backfill and depths of the padding backfill may also be specified.

There are several known devices and methods for padding a pipe within a trench. However, these known devices and methods are not as efficient or reliable as desired. The present invention provides an improved apparatus and method for backfilling a trench and padding a buried element in a single operation.

SUMMARY OF THE INVENTION

It is therefore a primary object, feature, or advantage of the present invention to overcome deficiencies in the art.

It is a further object of the present invention to provide a backfill device that will laterally move dirt from a spoil pile adjacent to a trench into a sifting device located above the trench, wherein the sifting device permits pieces of backfill spoil smaller than a desired size to drop into the trench, and moves pieces of backfill spoil larger than the desired size into a pile on the opposite side of the trench.

According to one embodiment, the present invention is a backfill device for back filling a trench with backfill fines of a desired size from a pile of backfill spoil adjacent to the trench. The backfill device has a lateral earth moving device with an open front portion, and a rotating member for moving backfill spoil toward a first end of the lateral earth moving apparatus. A sifting device is located at the first end of the dirt moving apparatus. The sifting device has a rotatable drum that is open on a first side to receive backfill spoil from the lateral dirt moving apparatus. The drum is open at a second side opposite from the first side. The drum has a plurality of sifting openings between the first and second ends of the drum. A sifting device is located at the first end of the dirt moving apparatus. The sifting device has a rotatable drum that is open on a first side to receive backfill spoil from the lateral dirt moving apparatus. The drum is open at a second side opposite from the first side. The drum has a plurality of sifting openings between the first and second ends of the rotating drum. A sifting device motor is operably connected to the drum to cause rotation of the drum. Pieces of backfill spoil smaller than the sifting openings will fall through the sifting openings into the trench directly below the sifting device and the pieces of backfill spoil larger than the sifting openings will be moved out of the second side of the sifting device by dirt entering the sifting portion through the first side.

According to another embodiment, the present invention is a method of backfilling a trench and padding an object in the trench using a backfill spoil pile located adjacent to the trench. A backfilling device is attached to a tractor. The backfilling device has a lateral earth moving device and a sifting device mounted at a first end of the lateral earth moving device. The lateral earth moving device has a rotatable member. The sifting device has a rotatable drum open to receive backfill spoil from the lateral earth moving device. The tractor is positioned adjacent to the trench with the lateral earth moving device aligned with the backfill spoil pile and the rotatable drum directly above the trench. The rotatable member of the lateral earth moving device is rotated. The drum of the sifting device is rotated. The tractor is moved to cause the rotating rotatable member to engage the backfill spoil pile, whereby a portion of the backfill spoil is moved laterally from the lateral earth moving device into the rotating drum, and further whereby pieces of the portion of the backfill spoil smaller than a desired size fall through the drum into the trench and pieces of the portion of backfill spoil larger than the desired size fall out an end of the drum opposite from the lateral earth moving device on an opposite side of the trench from the backfill spoil pile.

BRIEF DESCRIPTION OF THE DRAWINGS

FIG. 7 is an elevation view of a drum used in the sifting device of FIG. 5 including a flute for pushing larger pieces of the backfill material axially through the drum.

FIG. 8 is a side elevation view of the drum of FIG. 7.

DETAILED DESCRIPTION OF THE PREFERRED EMBODIMENTS

Figure 1:
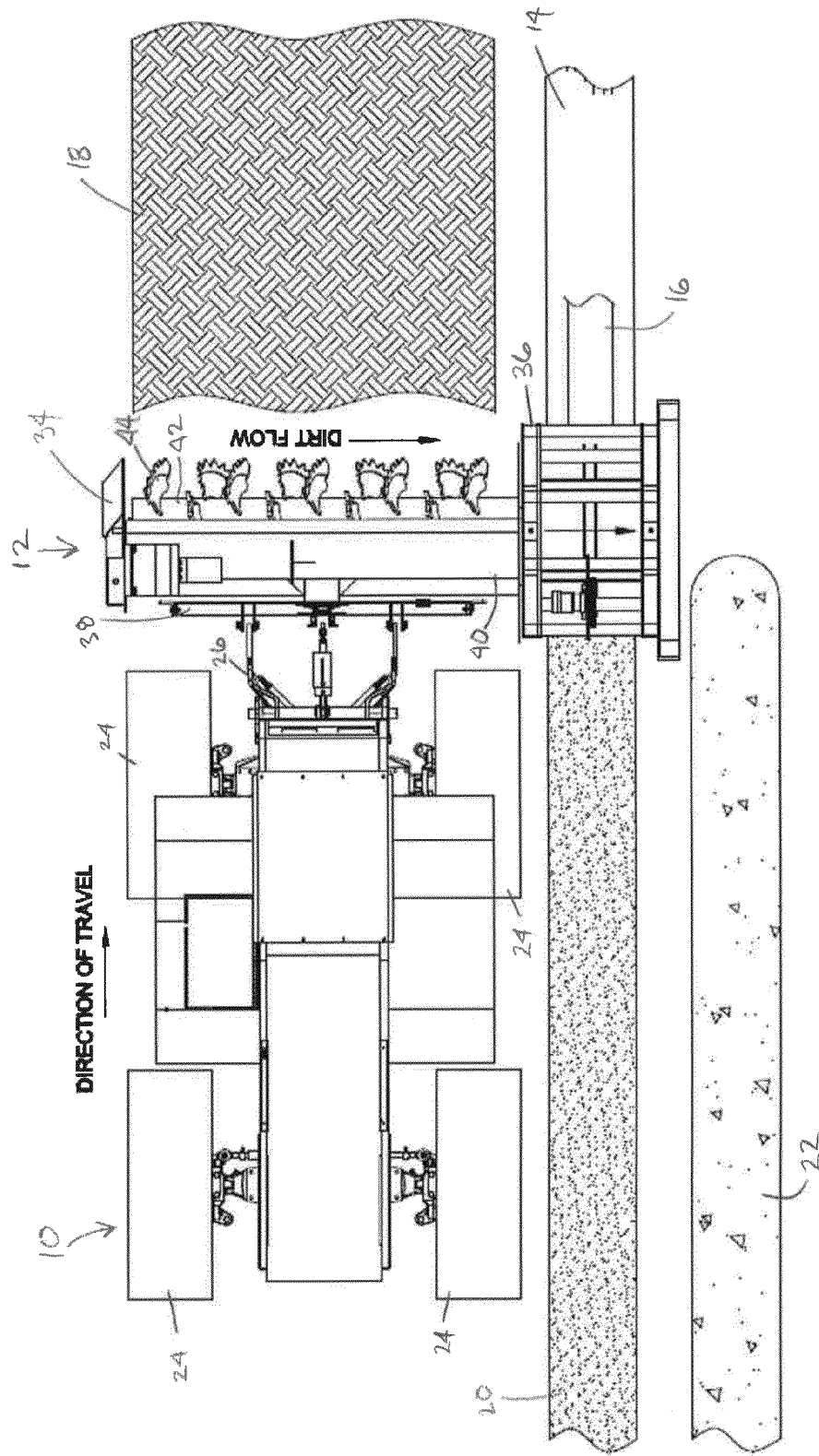
FIG. 1 is a top plan view of a tractor and backfill device according to one embodiment of the present invention in use backfilling a pipe within an open trench.
Figure 2:
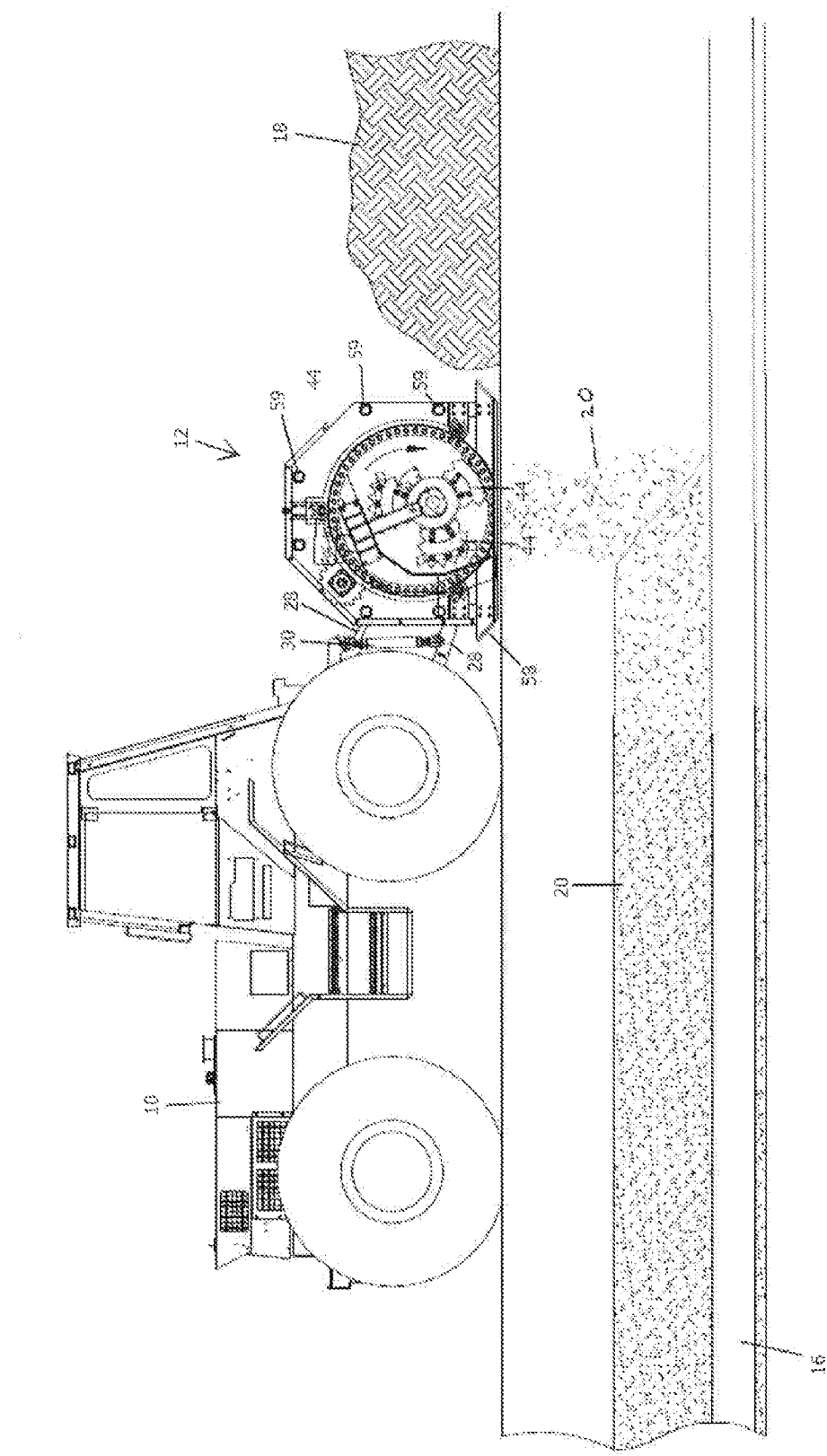
FIG. 2 is a trench-side elevation view of the tractor and backfill device of FIG. 1.

FIGS. 1-4 show a tractor 10 attached to and pushing a backfill device 12 according to one embodiment of the present invention. The tractor 10 is adjacent to and generally traveling parallel to a trench 14. A pipe 16 is located at the bottom of the trench 14. A pile of backfill spoil 18 is also located adjacent to the trench 14 in front of the backfill device 12. The backfill spoil 18 is the material that will be used to backfill the trench 14. Typically, the backfill spoil 18 is simply the dirt that was excavated to form the trench 14. The trench 14 is empty, other than the pipe 16, in the area in front of the backfill device 12. The trench 14 is partially filled with backfill fines (sifted backfill material) in the area behind the backfill device 12 where the backfill device 12 has already moved some of the backfill spoil into the trench 16. A pile of large backfill pieces 22 (rocks, large clumps of dirt, and other large features) is formed adjacent to the trench 14 on the opposite side of the trench 14 from the tractor 10 behind the backfill device 12.

The term tractor is used herein to refer to any suitable prime moving device that can be attached to the backfill device 12 and effectively move the backfill 12 into and through a backfill spoil pile 18 adjacent to a trench 14. For example, while the tractor 10 shown in the drawings travels on wheels 24, the prime moving device might be of the type that uses continuous tracks to engage the ground.

The backfill device 12 is connected to the tractor 10 by a hydraulic linkage 26. The hydraulic linkage 26 includes linkage bars 28 and at least one hydraulic cylinder 30. The hydraulic cylinder 30 is preferably controllable from the cockpit of the tractor 10 to raise and lower the backfill device 12.

The backfill device 12 includes two primary components: a lateral earth moving device 34 and a sifting device 36. The lateral earth moving device serves the purpose of moving the material in the backfill spoil pile 18 laterally towards and into the sifting device 36. The sifting device 36 serves the purpose of removing over-sized rocks, dirt clots, and other debris from the backfill material and dropping the sorted backfill material (backfill fines 20) into the trench 14 to form a pad around the buried element 16.

The lateral earth moving device 34 includes a rear bracket 38 that attaches to the hydraulic linkage 26 to connect the backfill device 12 to the tractor 10. The lateral earth moving device 34 also has a rear hood 40 which acts as a back wall for the lateral earth moving device 34 to capture and maintain the backfill spoil 18 within the lateral earth moving device 34 as the lateral earth moving device 34 is moved into the backfill spoil pile 18. Preferably the rear hood 40 has a back portion 41 that extends generally vertically upwardly from near ground level and has an arched or curved upper portion 43 that will reflect the backfill spoil 18 downwardly.

Figure 3:
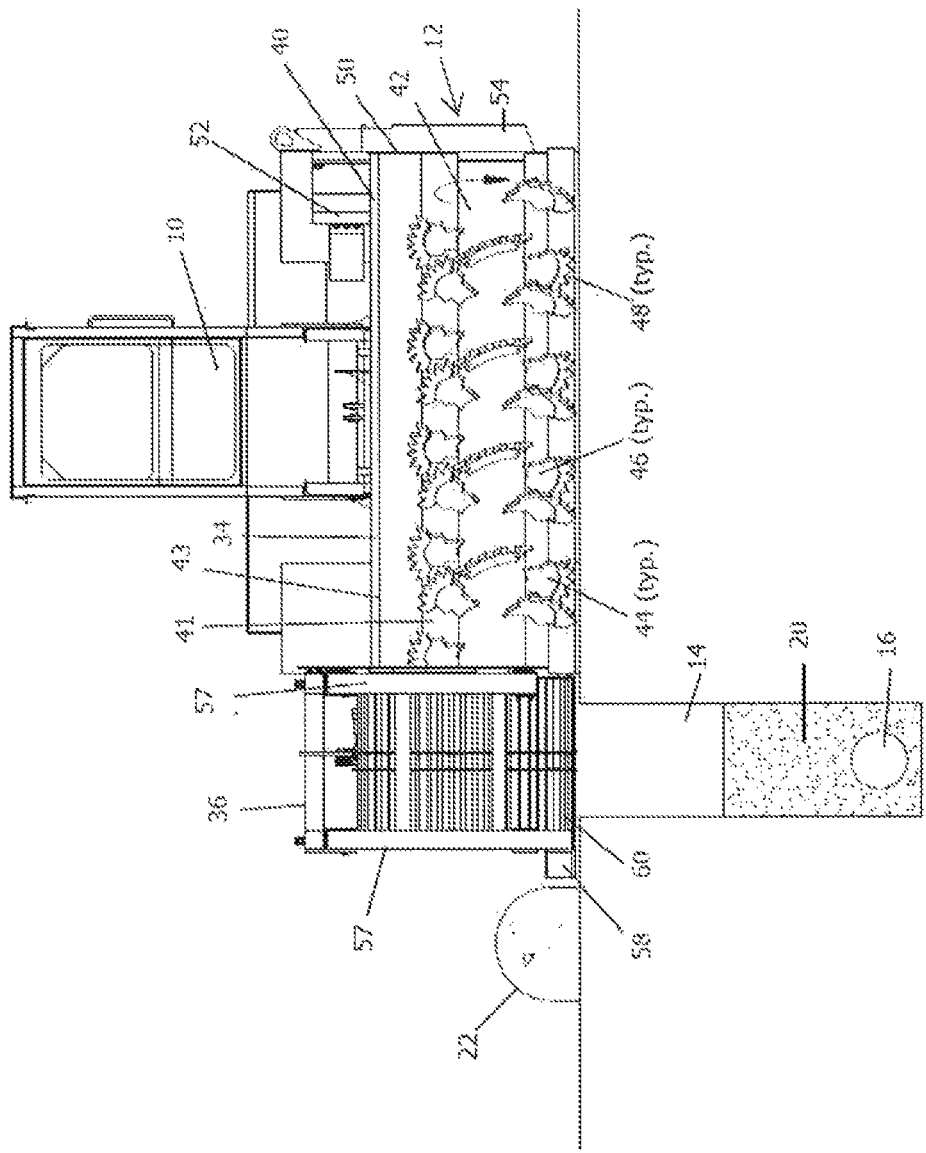
FIG. 3 is a front elevation view of the tractor and backfill device of FIG. 2 with the backfill spoil pile removed to show the details of the backfill device.
Figure 4:
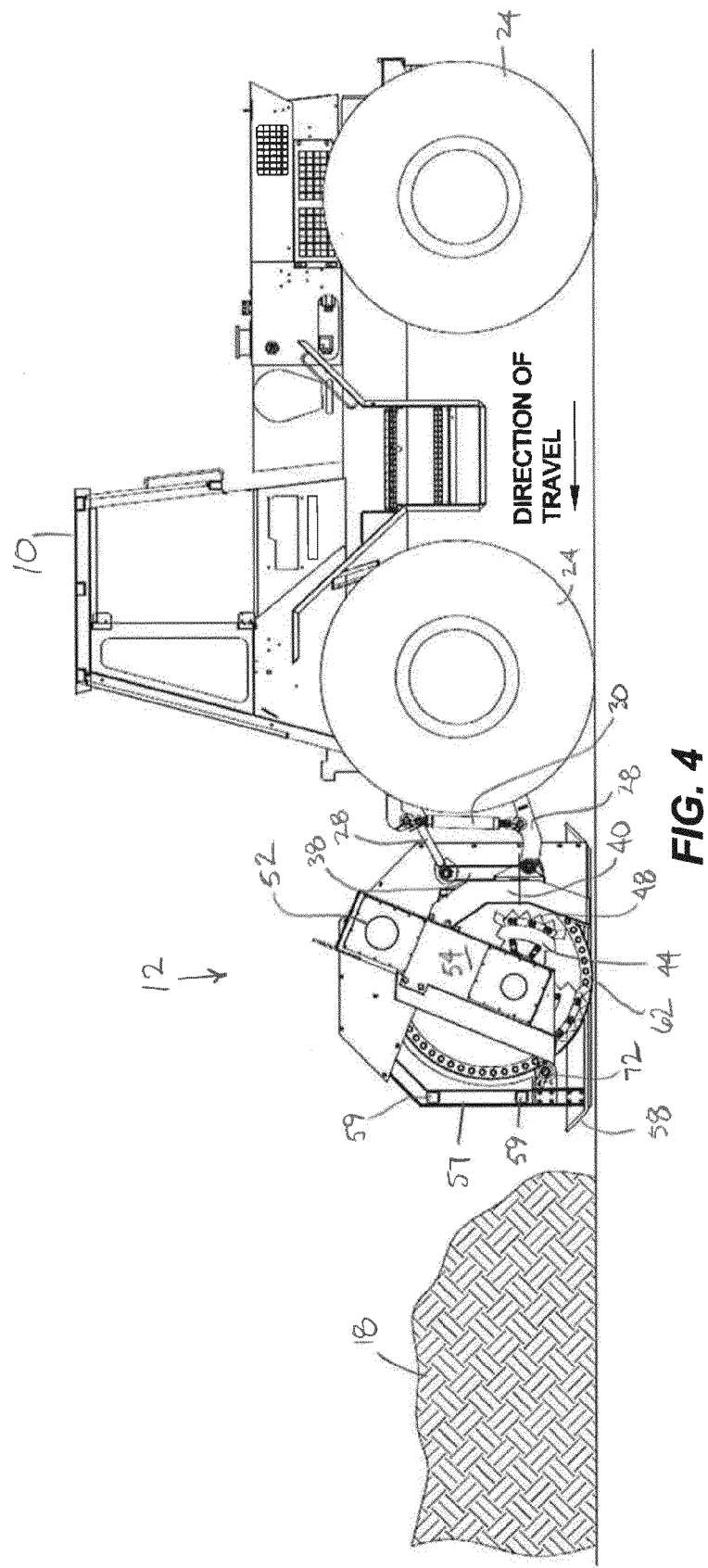
FIG. 4 is a non-trench-side elevation view of the tractor and backfill device of FIG. 1.

As best seen in FIG. 3, the lateral earth moving device 34 includes a rotatable member 42 that is rotatable about a generally horizontal axis located generally in front of the back portion 41 of the rear hood 40 and beneath the upper portion 43 of the rear hood 40. Backfill moving projections 44 extend from the rotatable member 42. The projections 44 extend radially from the rotatable member 42 and are mounted at an angle relative to the direction of rotation of the rotatable member 42. The projections 44 thereby have angled faces 46 that cause lateral movement of the backfill spoil 18 as the rotatable member 42 rotates while the backfill device 12 is being moved into the backfill spoil pile 18. Therefore, the angled faces 46 of the projections 44 act like a flight on an auger to laterally moves the backfill spoil 18 towards the trench end of the backfill device 12. The distal ends of the projections 44 are provided with teeth 48 that help to dig into and break up the backfill spoil 18. Using individual projections 44, rather than a single auger flight is also useful for helping to break-up the backfill spoil 18, as the teeth 48 and projections 44 dig into and move the backfill spoil 18 during use.

The lateral earth moving device 34 may also include a sidewall 50 on the side of the earth moving device 34 that is farthest from the trench 14. The sidewall 50 serves to retain the backfill spoil 18 within the lateral earth moving device 34. A motor 52 is provided to rotate the rotatable member 42. The motor 52 is mounted on the rear hood 40 and drives the rotatable member 42 via a drive belt (not shown) between a side cover 54 and the side wall 50. The motor 52 is preferably a hydraulic motor that is powered by the hydraulic system of the tractor 10. A hydraulic connection not shown is preferably provided between the tractor 10 and the motor 52. Alternatively, the hydraulic motor may be powered by a rotating shaft from a power takeoff on the tractor 10. As a further alternative, other known mechanisms for providing rotatable power may be used.

The sifting device 36 is mounted to and generally supported by the lateral earth moving device 34. The sifting device 36 is mounted on the trench side of the lateral earth moving device 34. In use, the sifting device 36 will be located directly above the trench 14. The lateral earth moving device 34 is open to the sifting device 36, such that backfill spoil 18 can pass from the lateral earth moving device 34 directly into the sifting device 36.

The sifting device 36 includes a framework 56 that provides support for the components of the sifting device 36. The framework 56 includes vertical walls or arches 57—one located adjacent to the lateral earth moving device 34 and one located at the opposite end—and stringers 59 that span laterally between the two arches 57. The framework 56 may also include a skid plate 58 that prevents the sifting device 36 from catching or pulling on the ground during use. The skid plate 58 may also serve to support some of the weight of the sifting device 36 on the ground on the opposite side of the trench 14 from the lateral earth moving device 34.

Figure 5:
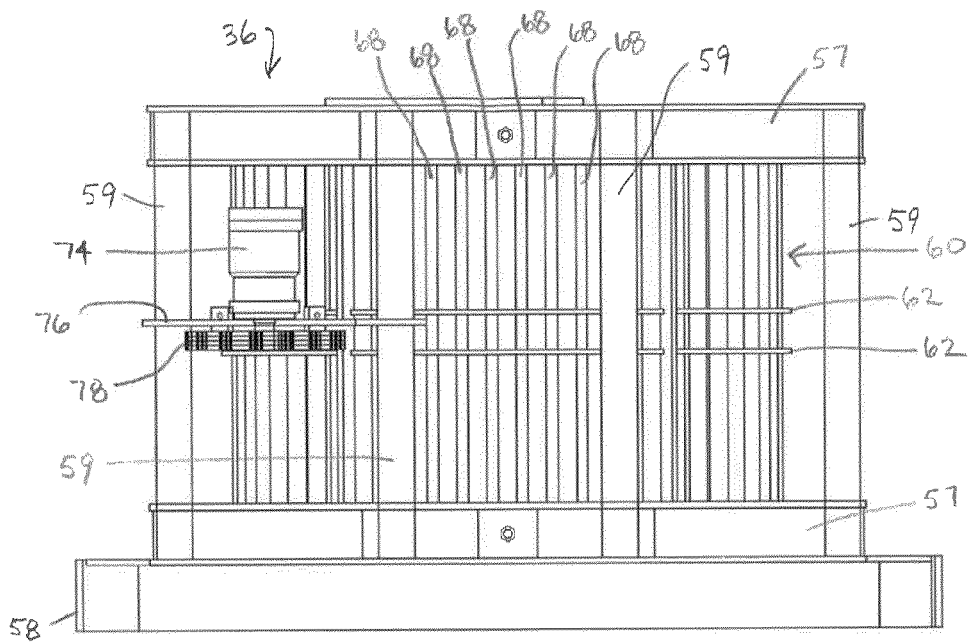
FIG. 5 is a top view of the sifting device portion of the backfill device apart from the backfill device.
Figure 6:
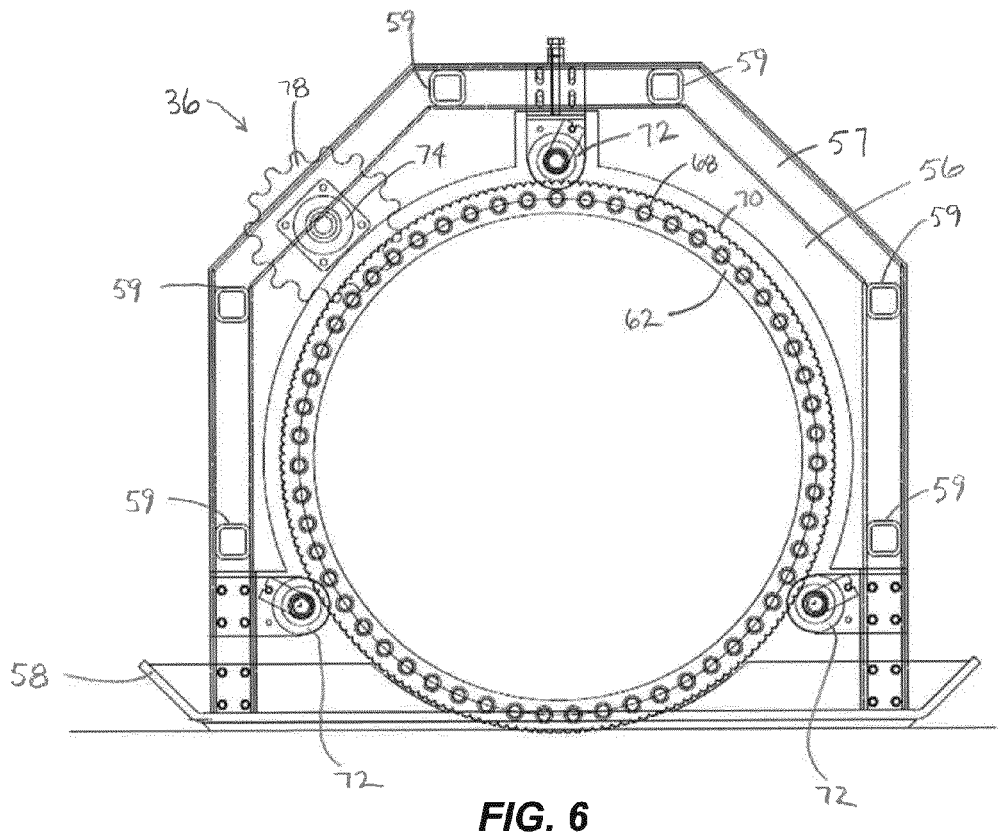
FIG. 6 is an elevation view of the sifting device of FIG. 5.

The sifting device 36 includes a rotatable sifting drum 60 that is mounted within the outer framework 56 to rotate about a generally horizontal axis that is offset below the axis of rotation of the rotatable member 42 of the lateral earth moving device 34. As best seen in FIGS. 5 and 6, the sifting drum 60 is formed from a plurality of generally circular hoops 62 that are connected together by lateral support bars 64. In the embodiment shown, four hoops 62 are used in axial alignment with each other. The hoops 62 are connected to each other by five lateral support bars 64 that are spaced at equal angles from each other around the circumferences of the hoops 62. The hoops 62 may be connected to the lateral support bars 64 by welding. Each of the hoops 62 may include a plurality of holes 66 that are used to support rods 68 that span between the hoops 62. The rods 68 form a mesh that determines a maximum-sized piece of backfill spoil 18 that can pass from the inside of the drum 60 to the outside of the drum 60. The rods 68 may be enclosed by tubular sleeves, for example an ultra-high molecular weight low friction plastic sleeve that helps prevent sticking of the backfill spoil 18 to the rods 68. As an alternative to rods 68, a wire mesh or similar sifting structure could be provided at the outer periphery of the drum 60.

Figure 10:
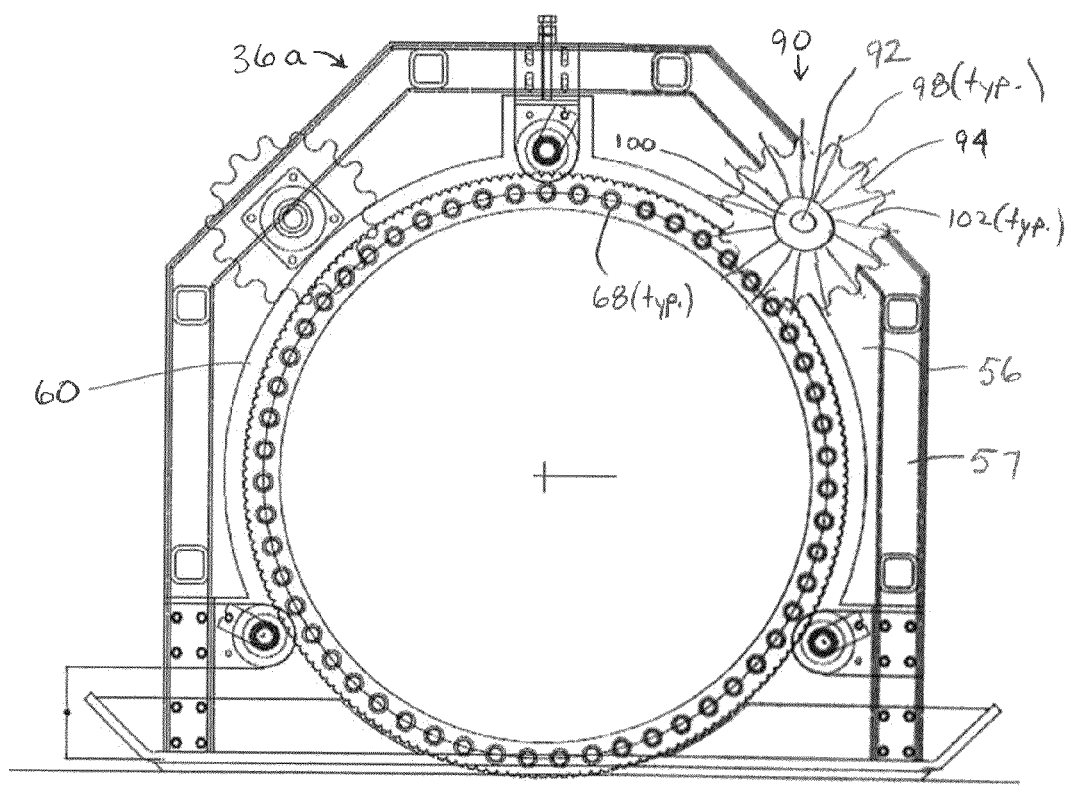
FIG. 10 is an elevation view of a sifting device according to an alternative embodiment of the present invention that includes a cleaning element to clean the sifting rods as the drum rotates.

FIG. 10 shows an alternative embodiment of the sifting device 36a, wherein a cleaning mechanism 90 is provided to clean mud, dirt or other debris that would otherwise stick to the rods 68 and clog the sifting mesh of the sifting drum 60. The cleaning mechanism 90 includes an axle 92 rotatably mounted to the framework 56 on a bearings (not shown) provided on arches 57. A cleaning mechanism spur gear 94 is securely mounted to the axle 92 and meshes with the rods 68 of the sifting drum 60. Therefore, rotation of the rotatable drum 60 causes corresponding rotation of the spur gear 94, which in turn rotates the axle 92. A plurality of cleaning members 98 are provided that extend radially outwardly from the axle 92. These cleaning members 98 may be compound structures that include a rigid proximal portion 100 and a resilient distal rod engaging portion 102. The rigid proximal portions 100 may be secured directly to a solid axle, or may form a drum-like structure that forms central portion of the axle 92. The resilient rod engaging portions 102 may be brush-like bristle structures or may be rubberized finger structures. The rod engaging portions 102 could be formed from linear fiber fingers made of a polyester-type belt. Those of skill in the art will be aware of numerous equivalent structures that would be satisfactory to form the resilient rod engaging portions 102. In operation, as the sifting drum 36 rotates, the cleaning members 98 will also rotate at the same rate, causing the resilient rod engaging portions 102 wipe and protrude between the rods 68 to scrub and abrade any mud or dirt that is stuck to the rods 68. This feature can be especially beneficial when operating the backfill device 12 in muddy conditions.

Idler wheels 72 are supported by arches 57 of the framework 56. There are three idler wheels 72 mounted to each of the arches 57. The outer surface of the circumference of the two outer hoops 62 bear against idler wheels 72, such that that sifting drum 60 is supported by the idler wheels 72. The idler wheels 72 are mounted to the arches 57 at roughly equal angles from each other around the circumference of the hoops 62. The outer surface of the circumference of the hoops 62 is an uneven surface 70. This uneven surface 70 acts against idler wheels 72 to impart a vibrating motion on the sifting drum 60 as the sifting drum 60 is rotated.

A sifting device motor 74 is supported by a motor plate 76 that is mounted between two of the stringers 59. The motor 74 is preferably a hydrostatic reversible motor. A spur gear 78 is driven by the motor 74. The spur gear 78 meshes with the rods 68. As the motor 74 rotates the spur gear 78, the spur gear 78 in turn pushes against the rods 68 causing the drum 60 to rotate. As the drum 60 rotates, the outer surface 70 of the hoops 62 bears against the idler wheels 72, causing the drum 60 to vibrate. The sifting drum 60 rotates independently of the rotatable member 42 of the lateral earth moving device 34.

Figure 9:
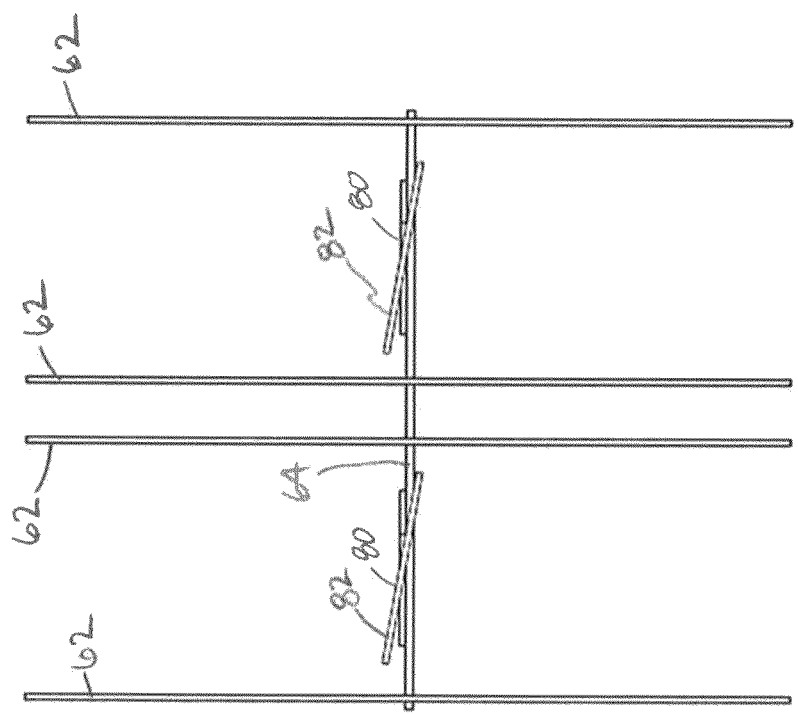
FIG. 9 is a bottom view of the drum of FIG. 8 with the lateral support bars removed.

According to an optional feature, the drum 60 may be provided with flutes 80 that are mounted on the lateral support bars 64. The flutes 80 are weldments that are bolted to the lateral support bars 64. As best seen in FIG. 9, each of the flutes 80 have an angled face 82 that urges fill within the drum 60 towards the trench side of the drum 60. This helps to move the rocks and debris that are too large to fit between the rods 68 out of the drum 60 to be deposited on the ground in a pile on the opposite side of the trench 14 from the backfill device 12. While the embodiment shown in FIGS. 7-9 includes only two flutes 80 mounted on the same lateral support bar 64, in practice additional flutes 80 may be provided on the other lateral support bars 64.

In operation a trench 14 is dug. The material excavated to form the trench 14 is piled adjacent to the trench 14 to form a pile of backfill spoil 18. The element to be buried 16 is placed in the trench 14. The back fill device 12 is attached to the tractor 10. The tractor 10 positioned adjacent to the trench with the lateral earth moving device 34 in alignment with the backfill spoil pile 18 and the sifting device 36 in alignment with the trench 14. The lateral earth moving device motor 52 is activated to rotate the rotatable member 42. The sifting device motor 74 is also activated to cause rotation of the sifting drum 60. The tractor is then driven forward to move the rotating projections on the rotating member of the lateral earth moving device 34 into the backfill spoil pile 18.

As the projections 44 rotate into the backfill spoil 18, the teeth 48 break apart the backfill spoil 18, and the angled faces 46 move the spoil 18 laterally towards the sifting device 36 and then into the sifting drum 60. The sifting drum 60 may be rotating at a different speed than the rotating member 42 of the lateral earth moving device 34. As the sifting drum 60 rotates, the hoops 62 reacting against the idler wheels 72 causes the drum 60 to vibrate as it rotates. The backfill spoil 18 within the drum 60 will be sifted by the rotating and vibrating action, such that pieces smaller than the spacing between the rods 68 will fall through the rods 68. Because the drum 60 is aligned over the trench 14, the backfill fines 20 fall into the trench 14 and cover the pipe 16 and form a pad.

The pieces of the backfill spoil 18 that are too large to fit through the spaces between the rods 68 will be forced out of the drum 60 on opposite side of the trench 14 by the force of new unsifted backfill spoil 18 being driven into the drum 60. If the drum includes flutes 80, the flutes 80 also help laterally move the large debris across and out of the drum 60. The large pieces of back fill that fall out of the end of the drum 60 form a pile of large backfill pieces 22 along the side of the trench 14. This pile of large backfill pieces 22 can later be backfilled on top of the pad formed by the backfill fines 20.

In addition, numerous various, adjustments, substitutions, and the like may be incorporated into the present invention and are intended to be considered a part of the present invention. It should be understood that additional changes and modifications to the embodiment shown and described herein will be apparent to those skilled in the art. Such changes and modifications may be made without departing from the spirit and scope of the invention, and without diminishing its advantages. It is intended, therefore, that such changes and modifications be covered by the embodiments of the invention.

What is claimed is:

1. A backfill device for back filling a trench with backfill fines of a desired size from a pile of backfill spoil adjacent to the trench, the backfill device comprising:
    a lateral earth moving device having an open front portion, and a rotating member for moving backfill spoil toward a first end of the lateral earth moving apparatus;
    a sifting device located at the first end of the dirt moving apparatus, the sifting device having a rotatable drum that is open on a first side to receive backfill spoil from the lateral dirt moving apparatus, the drum being open at a second side opposite from the first side, the drum having a plurality of sifting openings between the first and second ends of the rotating drum;
    a sifting device motor operably connected to the drum to cause rotation of the drum; whereby
    pieces of backfill spoil smaller than the sifting openings will fall through the sifting openings into the trench directly below the sifting device and the pieces of backfill spoil larger than the sifting openings will be moved out of the second side of the sifting device by dirt entering the sifting portion through the first side.

2. The backfill device of claim 1, wherein the rotating drum comprises a set of hoops laterally spaced apart from each other, hoops supporting a plurality of rods spanning between the hoops, and wherein the sifting openings are formed by spaces between the rods.

3. The backfill device of claim 2, wherein the sifting device motor rotates a spur gear, and further wherein the spur gear engages the rods.

4. The backfill device of claim 2 wherein the sifting device comprises idler wheels, and further wherein at least one of the hoops has an uneven circumferential surface in engagement with the idler wheels, such that rotation of the drum causes a vibratory motion of the drum as the uneven circumferential surface interacts with the idler wheels.

5. The backfill device of claim 1, further comprising a cleaning mechanism within the sifting device that includes resilient rod engaging portions to clean dirt from the rods as the sifting drum rotates.

6. The backfill device of claim 1, wherein the rotating member and the drum rotate at different speeds.

7. The backfill device of claim 1, wherein the drum further comprises a flute extending inwardly in the drum, the flute having an angled surface to urge backfill pieces toward the second side of the sifting device.

8. The backfill device of claim 1, wherein the backfill motor is a reversible hydraulic motor.

9. The backfill device of claim 1, wherein the rotatable member includes projections adapted to break apart the backfill spoil and move the backfill spoil laterally towards the first end of the lateral earth moving device.

10. The backfill device of claim 9, wherein the projections have teeth at a distal end of the projections.

11. A method of backfilling a trench and padding an object in the trench using a backfill spoil pile located adjacent to the trench, the method comprising:
providing a backfilling device attached to a tractor, the backfilling device having a lateral earth moving device and a sifting device mounted at a first end of the lateral earth moving device, the lateral earth moving device having a rotatable member, the sifting device having a rotatable drum open to receive backfill spoil from the lateral earth moving device;
positioning the tractor adjacent to the trench with the lateral earth moving device aligned with the backfill spoil pile and the rotatable drum directly above the trench;
rotating the rotatable member of the lateral earth moving device;
rotating the drum of the sifting device; and
moving the tractor to cause the rotating rotatable member to engage the backfill spoil pile, whereby a portion of the backfill spoil is moved laterally from the lateral earth moving device into the rotating drum, and whereby pieces of the portion of the backfill spoil smaller than a desired size fall through the drum into the trench and pieces of the portion of backfill spoil larger than the desired size fall out an end of the drum opposite from the lateral earth moving device on an opposite side of the trench from the backfill spoil pile.

12. The method of claim 11, further comprising vibrating the rotating drum.

13. The method of claim 12, wherein the sifting device comprises idler wheels, and further wherein the drum comprises at least one hoop that has an uneven circumferential surface in engagement with the idler wheels, and wherein the step of vibrating the rotating drum is performed by rotating the hoop against the idler wheels.

14. The method of claim 11 wherein the rotatable member and the rotating drum are rotated at different speeds.

15. The method of claim 11, wherein the rotatable member includes projections adapted to break apart the backfill spoil and move the backfill spoil laterally.

16. The method of claim 11, wherein the drum further comprises a flute extending inwardly in the drum, the flute having an angled surface to urge backfill pieces toward the end of the drum opposite from the lateral earth moving device.

17. The method of claim 11, wherein the rotating drum comprises a set of hoops laterally spaced apart from each other, the hoops supporting a plurality of rods spanning between the hoops, and wherein sifting openings are formed by spaces between the rods, and wherein a sifting device motor rotates a spur gear, and further wherein the spur gear engages the rods to cause the rotating of the drum.

18. The method of claim 17, wherein the sifting device further comprises a cleaning mechanism within the sifting device that includes resilient rod engaging portions to clean dirt from the rods as the sifting drum rotates.

19. The method of claim 17, wherein the resilient rod engaging portions are mounted to an axle driven by a cleaning mechanism spur gear that engages and is driven by the rods.

* * * * *